US008521143B2

(12) United States Patent
Balasubramaniam et al.

(10) Patent No.: US 8,521,143 B2
(45) Date of Patent: Aug. 27, 2013

(54) USER INTERFACE METHODS AND APPARATUS FOR USE IN COMMUNICATING MESSAGES TO MULTIPLE RECIPIENTS

(75) Inventors: Mahadevan Balasubramaniam, Andover, MA (US); Ryan Alexander Holt, Andover, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 206 days.

(21) Appl. No.: 13/087,876

(22) Filed: Apr. 15, 2011

(65) Prior Publication Data

US 2011/0281596 A1    Nov. 17, 2011

Related U.S. Application Data

(60) Provisional application No. 61/326,520, filed on Apr. 21, 2010.

(51) Int. Cl.
*H04L 29/08* (2006.01)
*H04L 12/58* (2006.01)
*H04W 4/00* (2009.01)
*G06F 15/16* (2006.01)

(52) U.S. Cl.
USPC ............... 455/414.4; 455/466; 455/412.1; 709/206

(58) Field of Classification Search
USPC ............ 455/466, 414.1, 414.2, 414.3, 414.4, 455/412.1; 709/206
See application file for complete search history.

(56) References Cited

U.S. PATENT DOCUMENTS

| 7,028,263 | B2 | 4/2006 | Maguire |
| 7,218,943 | B2 | 5/2007 | Klassen et al. |
| 7,552,185 | B1 | 6/2009 | Kirzner et al. |
| 2003/0163537 | A1 | 8/2003 | Rohall et al. |
| 2004/0015548 | A1 | 1/2004 | Lee |
| 2004/0136376 | A1 | 7/2004 | Einamo |
| 2004/0185883 | A1 | 9/2004 | Rukman |
| 2006/0075033 | A1* | 4/2006 | Bienstock et al. ............ 709/206 |
| 2007/0033250 | A1 | 2/2007 | Levin et al. |

(Continued)

FOREIGN PATENT DOCUMENTS

EP    1653398 A1    5/2006

OTHER PUBLICATIONS

European Search Report & Written Opinion, EP Patent Application # 11163401.0, Nov. 9, 2011.

*Primary Examiner* — Christopher M Brandt
(74) *Attorney, Agent, or Firm* — John J. Oskorep, Esq.

(57) ABSTRACT

Methods and apparatus for use in communicating messages to multiple recipients are described. A wireless device receives a first input request for creating a new message, and also receives one or more second input requests for selecting a plurality of recipient identifiers for the new message. The wireless device also receives a third input request which indicates whether or not the message is for a group conversation. When the third input request indicates group conversation, the wireless device formats the recipient identifiers in first header fields (e.g., CC header fields) of an MMS message. When the third input request indicates no group conversation, the wireless device alternatively formats the recipient identifiers in second header fields (e.g., BCC header fields) of the MMS message. The MMS message is then transmitted to the recipient identifiers via a wireless network. Recipient devices may process the message as group or non-group (e.g., broadcast) depending on the field locations of the recipient identifiers.

24 Claims, 11 Drawing Sheets

(56) References Cited

U.S. PATENT DOCUMENTS

| | | |
|---|---|---|
| 2007/0087766 A1 | 4/2007 | Hardy et al. |
| 2007/0124704 A1 | 5/2007 | Oh |
| 2007/0173267 A1 | 7/2007 | Klassen et al. |
| 2007/0233788 A1* | 10/2007 | Bender .................. 709/206 |
| 2007/0280179 A1 | 12/2007 | Van Belle et al. |
| 2008/0005685 A1* | 1/2008 | Drews et al. .................. 715/764 |
| 2008/0153459 A1 | 6/2008 | Kansal et al. |
| 2008/0172462 A1 | 7/2008 | Carrer et al. |
| 2008/0235334 A1* | 9/2008 | Gupta et al. .................. 709/206 |
| 2008/0295000 A1* | 11/2008 | Kieselbach et al. .......... 715/752 |
| 2009/0043862 A1* | 2/2009 | Bordia .................. 709/206 |
| 2009/0083389 A1 | 3/2009 | Kirkland et al. |
| 2010/0048231 A1 | 2/2010 | Donald et al. |
| 2010/0057858 A1* | 3/2010 | Shen et al. .................. 709/206 |
| 2010/0161738 A1* | 6/2010 | Pascal et al. .................. 709/206 |
| 2010/0312836 A1* | 12/2010 | Serr et al. .................. 709/206 |
| 2011/0055334 A1* | 3/2011 | Tivyan .................. 709/206 |
| 2011/0087972 A1* | 4/2011 | Swink et al. .................. 715/752 |
| 2011/0136519 A1* | 6/2011 | Bailey et al. .................. 455/466 |
| 2011/0225245 A1* | 9/2011 | Bhogal et al. .................. 709/206 |

* cited by examiner

Individual

Broadcast

Group

USER INTERFACE METHODS AND APPARATUS FOR USE IN COMMUNICATING MESSAGES TO MULTIPLE RECIPIENTS

CROSS-REFERENCE TO RELATED APPLICATION

The present application claims priority to U.S. provisional application having application No. 61/326,520 and filing date of 21 Apr. 2010, which is hereby incorporated by reference herein.

BACKGROUND

1. Field of the Technology

The present disclosure relates generally to communication devices and messaging, and more particularly to user interface techniques for use in communicating messages to multiple recipients from mobile communication devices which operate in wireless communication networks.

2. Description of the Related Art

Today, wireless communication devices which operate in wireless communication networks have capabilities which may include wireless telephony and wireless messaging. Wireless messaging may include electronic-mail (e-mail) messaging, text messaging such as short message service (SMS) messaging or multimedia messaging service (MMS) messaging, or instant messaging, messaging in chat sessions, as examples.

A user of a wireless communication device may wish to communicate messages to multiple recipients, and may not be concerned with what underlying type of messaging or technology is utilized by the device for such purpose. Different types of input fields may be provided for by the messaging application for entering in recipient addresses. For example, in a typical e-mail application, the types of input fields may include TO fields, CC ("carbon copy") fields, and BCC ("blind carbon copy") fields. However, allowing all of these different types of fields for messaging may overcomplicate the user interface.

What are needed are methods and apparatus to overcome these and related or similar deficiencies of the prior art. The same or similar problems may exist in other devices or messaging types.

BRIEF DESCRIPTION OF THE DRAWINGS

Embodiments of present disclosure will now be described by way of example with reference to attached figures, wherein.

DETAILED DESCRIPTION OF THE EMBODIMENTS

Methods and apparatus for use in communicating messages to multiple recipients from a wireless communication device are described herein. The new message may be communicated as a multimedia messaging service (MMS) message, for example. The wireless device receives, via the user interface, a first input request for creating a new message, as well as one or more second input requests for selecting a plurality of recipient identifiers (e.g., in "TO" fields) of the new message. The wireless device also receives, via the user interface, a third input request for indicating whether or not the new message is for a group conversation. When the third input request indicates that the new message is for a group conversation, the wireless device formats each recipient identifier in a first header field (e.g., CC header field) of the message. When the third input request indicates that the new message is not for a group conversation, the wireless device formats each recipient identifier in a second header field (e.g., BCC header field) of the message. The message is then transmitted, via the wireless communication network, to the recipient identifiers via a wireless communication network. Recipient devices may process the message as group or non-group (e.g., broadcast) depending on the field locations of the recipient identifiers.

Figure 1:
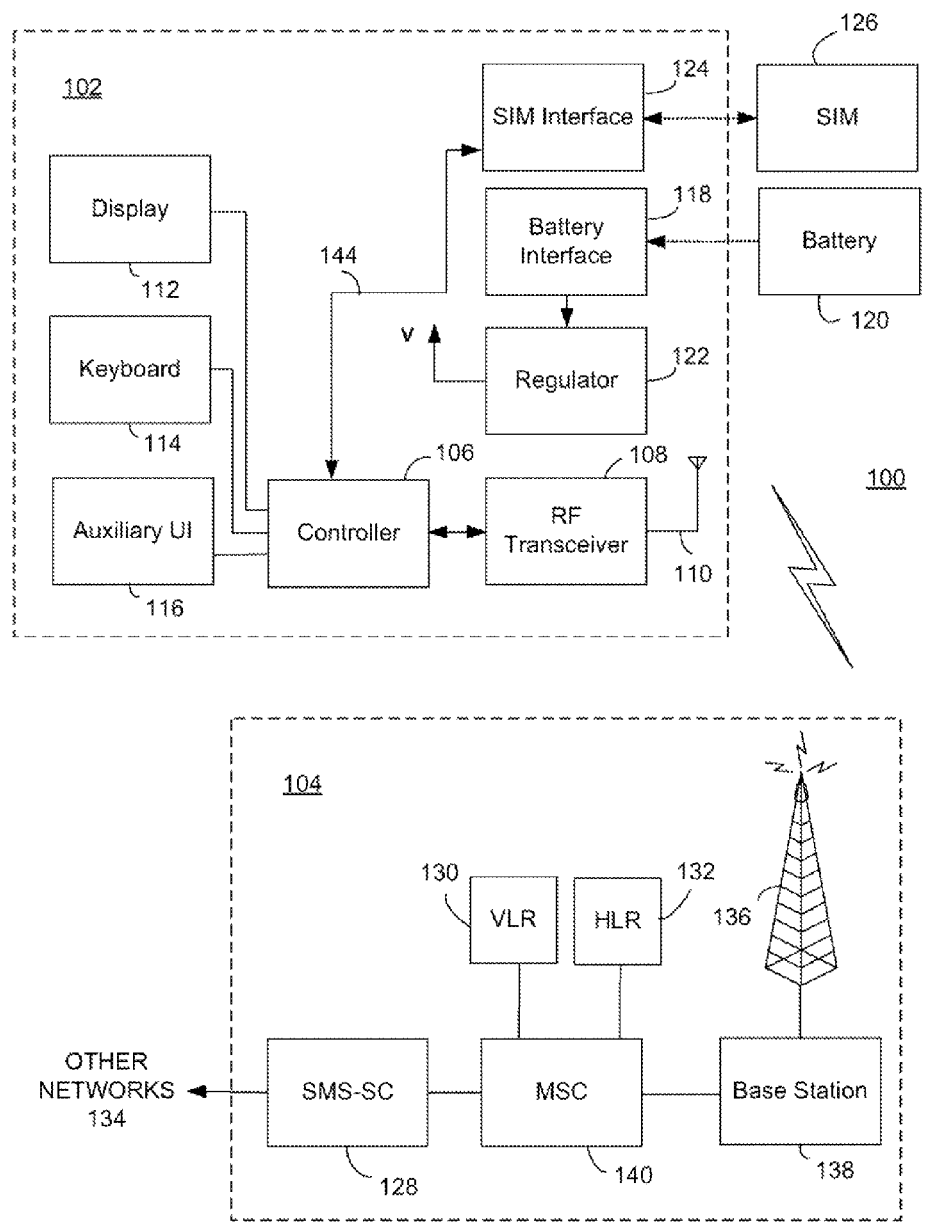
FIG. 1 is a block diagram of a communication system which includes a wireless communication device for communicating in a wireless communication network.

To illustrate one exemplary environment within which the present techniques may be practiced, FIG. 1 is a block diagram of a communication system 100 which includes a wireless communication device 102 which communicates through a wireless communication network 104. Wireless communication device 102 may include a visual display 112, a keyboard 114, and one or more auxiliary user interfaces (UI) 116, each of which is coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 normally controls overall operation of wireless device 102, whereas signal processing operations associated with communication functions are typically performed in RF transceiver circuitry 108. Controller 106 interfaces with device display 112 to display received information, stored information, input requests, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different input requests. In one embodiment, keyboard 114 may be or include a physical keyboard or a virtual or "soft" keyboard, implemented, for example, by way of images of keys rendered on a touch screen display.

Wireless device 102 sends communication signals to and receives communication signals from network 104 over a wireless link via antenna 110. RF transceiver circuitry 108 performs functions similar to those of base station 138, including for example modulation/demodulation and possibly encoding/decoding and encryption/decryption. It is also contemplated that RF transceiver circuitry 108 may perform certain functions in addition to those performed by base station 138. It will be apparent to those skilled in art that RF transceiver circuitry 108 will be adapted to particular wireless network or networks in which wireless device 102 is intended to operate.

Wireless device 102 includes a battery interface 118 for receiving one or more rechargeable batteries 120. Battery 120 provides electrical power to (most if not all) electrical circuitry in wireless device 102, and battery interface 118 provides for a mechanical and electrical connection for battery 120. Battery interface 118 is coupled to a regulator 122 which regulates power for the device. When wireless device 102 is fully operational, an RF transmitter of RF transceiver circuitry 108 is typically keyed or turned on only when it is sending to network 104, and is otherwise turned off to conserve resources. Such intermittent operation of transmitter has a dramatic effect on power consumption of wireless device 102. Similarly, an RF receiver of RF transceiver circuitry 108 is typically periodically turned off to conserve power until it is needed to receive signals or information (if at all) during designated time periods.

Wireless device 102 may consist of a single unit, such as a data communication device, a cellular telephone, a multiple-function communication device with data and voice communication capabilities such as a mobile telephone with data communication functionality, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 202 of FIG. 2.

Wireless device 102 may operate using a Subscriber Identity Module (SIM) 126 which is connected to or inserted in wireless device 102 at a SIM interface 124. SIM 126 is one type of a conventional "smart card" used to identify an end user (or subscriber) of wireless device 102 and to personalize the device, among other things. Without SIM 126, the wireless device terminal is not fully operational for communication through wireless network 104. By inserting SIM 126 into wireless device 102, an end user can have access to any and all of his/her subscribed services. In order to identify the subscriber, SIM 126 contains some user parameters such as an International Mobile Subscriber Identity (IMSI) and a Mobile Station Integrated International Service Digital Network (MSISDN). In addition, SIM 126 is typically protected by a Personal Identification Number (PIN) which is stored therein and known only by the end user. An advantage of using SIM 126 is that end users are not necessarily bound by any single physical wireless device. Typically, the only element that personalizes a wireless device terminal is a SIM card. Therefore, the user can access subscribed services using any wireless device equipped to operate with the user's SIM 126.

Some information stored on SIM 126 (e.g., address book and SMS messages) may be retrieved and visually displayed on display 112. Wireless device 102 has one or more software applications which are executed by controller 106 to facilitate the information stored on SIM 126 to be displayed on display 112. Controller 106 and SIM interface 124 have data and control lines 144 coupled therebetween to facilitate the transfer of the information between controller 106 and SIM interface 124 so that it may be visually displayed. An end user enters input request signals at keyboard 114, for example, and in response, controller 106 controls SIM interface 124 and SIM 126 to retrieve the information for display. The end user may also enter input request signals at keyboard 114, for example, and, in response, controller 106 controls SIM interface 124 and SIM 126 to store information on SIM 126 for later retrieval and viewing. The software applications executed by controller 106 include an application to retrieve and display address book information stored on SIM 126, and an application to retrieve and display SMS message information stored on SIM 126.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 138 with an associated antenna tower 136, a Mobile Switching Center (MSC) 140, a Visitor Location Register (VLR) 130, a Home Location Register (HLR) 132, and a Short Message Service Center (SMS-SC) 128. MSC 140 is coupled to base station 138 and to SMS-SC 128, which is in turn coupled to other network(s) 134.

Base station 138, including its associated controller and antenna tower 136, provides wireless network coverage for a particular coverage area commonly referred to as a "cell". Base station 138 transmits communication signals to and receives communication signals from wireless devices within its cell via antenna tower 136. Base station 138 normally performs such functions as modulation and possibly encoding and/or encryption of signals to be transmitted to the wireless device in accordance with particular, usually predetermined, communication protocols and parameters, under control of its controller. Base station 138 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. Those skilled in art will appreciate that a wireless network in actual practice may include hundreds of cells, each served by a distinct base station 138 and transceiver, depending upon desired overall expanse of network coverage. All base station controllers and base stations may be connected by multiple switches and routers (not shown), controlled by multiple network controllers.

For all wireless devices 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. VLR 130 is responsible for a group of location areas and stores the data of those wireless devices that are currently in its area of responsibility. This includes parts of the permanent wireless device data that have been transmitted from HLR 132 to VLR 130 for faster access. However, VLR 130 may also assign and store local data, such as temporary identifications. Optionally, VLR 130 can be enhanced for more efficient co-ordination of GPRS and non-GPRS services and functionality (e.g., paging for circuit-switched calls, and combined GPRS and non-GPRS location updates).

Being part of the GPRS network, a Serving GPRS Support Node (SGSN) is at the same hierarchical level as MSC 140 and keeps track of the individual locations of wireless devices. An SGSN also performs security functions and access control. Further, a Gateway GPRS Support Node (GGSN) provides interworking with external packet-switched networks and is connected with SGSNs via an IP-based GPRS backbone network. The SGSN performs authentication and cipher setting procedures based on the same algorithms, keys, and criteria as in existing GSM. For SMS transfer over GPRS, the SGSN is used in place of MSC 140.

In order to access GPRS services, wireless device 102 first makes its presence known to wireless network 104 by performing what is known as a GPRS "attach". This operation establishes a logical link between wireless device 102 and the SGSN and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to the GGSN; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and the GGSN.

SMS makes use of SMS-SC 128 which acts as a store-and-forward system for relaying short messages. Messages are stored in the network until the destination device becomes available, so a user can receive or transmit an SMS message at any time, whether a voice call is in progress or not. SMS-SC 128 may be integrated with a Gateway MSC for Short Message Service (SMS-GMSC) and an Interworking MSC for Short Message Service (SMS-IWMSC), as would be the case shown in FIG. 1. An SMS-GMSC is a function for receiving a short message from an SMS-SC, interrogating an HLR for routing information and SMS info, and delivering the short message for the recipient MS. An SMS-IWMSC is a function for receiving a short message from within the network and submitting it to the recipient SMS-SC. Other messages which may be delivered are Multimedia Messaging Service (MMS) messages. The above configuration may be provided in substantial accordance with $3^{rd}$ Generation Partnership Project, Technical Specification 03.40, V6.2.0, 2001-12 (Release 1997) (3GPP TS 03.40).

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1.

Figure 2:
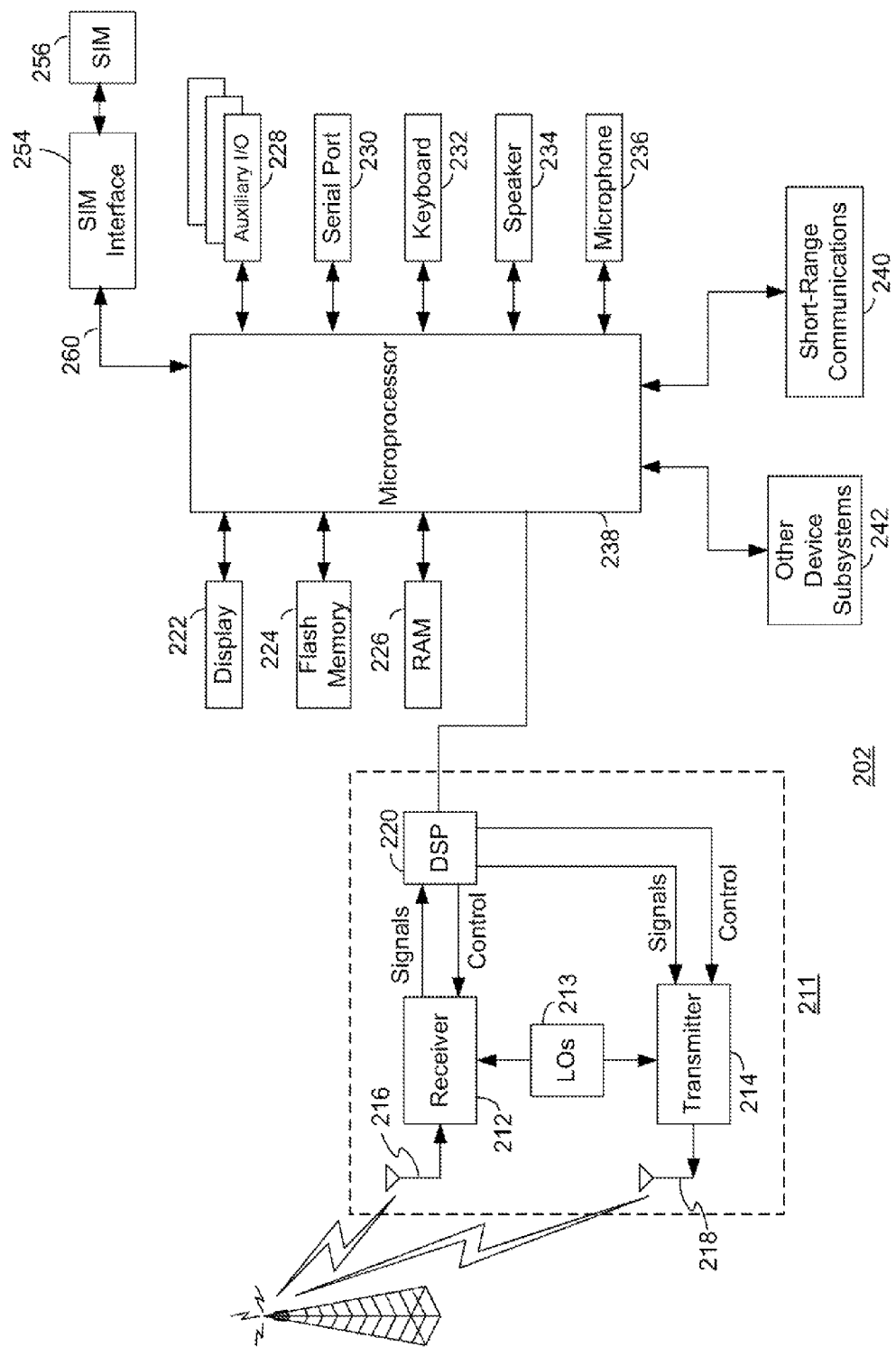
FIG. 2 is a more detailed example of a wireless communication device for use in the wireless communication network.

FIG. 2 is a detailed block diagram of an exemplary wireless communication device 202. Wireless device 202 may be a two-way communication device having at least voice and data communication capabilities, including the capability to communicate with other computer systems. Depending on the functionality provided by wireless device 202, it may be referred to as a data messaging device, a two-way pager, a cellular telephone with data messaging capabilities, a wireless Internet appliance, or a data communication device (with or without telephony capabilities). Wireless device 202 may be a mobile station.

If wireless device 202 is enabled for two-way communication, it will normally incorporate a communication subsystem 211, which includes a receiver 212, a transmitter 214, and associated components, such as one or more (e.g., embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which wireless device 202 is intended to operate.

Network access requirements will also vary depending upon type of network utilized. In GPRS networks, for example, network access is associated with a subscriber or user of wireless device 202. A GPRS device therefore operates in conjunction with a Subscriber Identity Module, commonly referred to as a "SIM" card 256, in order to operate on the GPRS network. Without such a SIM card 256, a GPRS device will not be fully functional. Local or non-network communication functions (if any) may be operable, but wireless device 202 will be unable to carry out any functions involving communications over the network. SIM 256 includes those features described in relation to FIG. 1.

Wireless device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 254 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM), a battery backed-up RAM, or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on wireless device 202. A predetermined set of applications which control basic device operations, including at least data and voice communication applications (such as a user interface technique), will normally be installed on wireless device 202 during its manufacture. One exemplary application that may be loaded onto wireless device 202 may be a personal information manager (PIM) application having the ability to organize and manage data items relating to user such as, but not limited to, e-mail, calendar events, voice mails, appointments, and task items. Naturally, one or more memory stores are available on wireless device 202 and SIM 256 to facilitate storage of PIM data items and other information.

The PIM application has the ability to send and receive data items via the wireless network. In an exemplary embodiment, PIM data items are seamlessly integrated, synchronized, and updated via the wireless network, with the wireless device user's corresponding data items stored and/or associated with a host computer system thereby creating a mirrored host computer on wireless device 202 with respect to such items. This is especially advantageous where the host computer system is the wireless device user's office computer system. Additional applications may also be loaded onto wireless device 202 through network, an auxiliary I/O subsystem 228, serial port 230, short-range communications subsystem 240, or any other suitable subsystem 242, and installed by a user in RAM 226 or a non-volatile store for execution by microprocessor 238. Such flexibility in application installation increases the functionality of wireless device 202 and may provide enhanced on-device functions, communication-related functions, or both. For example, secure communication applications may enable electronic commerce functions and other such financial transactions to be performed using wireless device 202.

In a data communication mode, data such as an SMS message will be processed by communication subsystem 211 and input to microprocessor 238. Microprocessor 238 may further process the signal for output to display 222 or alternatively to auxiliary I/O device 228. A user of wireless device 202 may also compose data items, such as SMS messages, using keyboard 232 in conjunction with display 222 and possibly auxiliary I/O device 228. Keyboard 232 may be a complete alphanumeric keyboard and/or telephone-type keypad. In one embodiment, keyboard 232 may be or include a physical keyboard or a virtual or "soft" keyboard, implemented, for example, by way of images of keys rendered on a touch screen display. The composed items may be transmitted over a communication network through communication subsystem 211.

For voice communications, the overall operation of wireless device 202 is substantially similar, except that the received signals are output to speaker 234 and signals for transmission are generated by microphone 236. Alternative voice or audio I/O subsystems, such as a voice message recording subsystem, may also be implemented on wireless device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to wireless device 202 other than through a wireless communication network. The alternate download path may, for example, be used to load an encryption key onto wireless device 202 through a direct and thus reliable and trusted connection to thereby provide secure device communication.

Short-range communications subsystem 240 of FIG. 2 is an additional optional component which provides for communication between wireless device 202 and different systems or devices, which need not necessarily be similar devices. For example, subsystem 240 may include an infrared device and associated circuits and components, a Bluetooth™ communication module, or an 802.11 communication module, to provide for communication with similarly-enabled systems and devices. Bluetooth™ is a registered trademark of Bluetooth SIG, Inc. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

Wireless device 202 may also include a battery interface, such as that described in relation to FIG. 1, for receiving one or more rechargeable batteries. Such a battery provides electrical power to most if not all electrical circuitry in wireless device 202, and the battery interface provides for a mechanical and electrical connection for it. The battery interface is coupled to a regulator which regulates a voltage to all of the circuitry.

Figure 3:
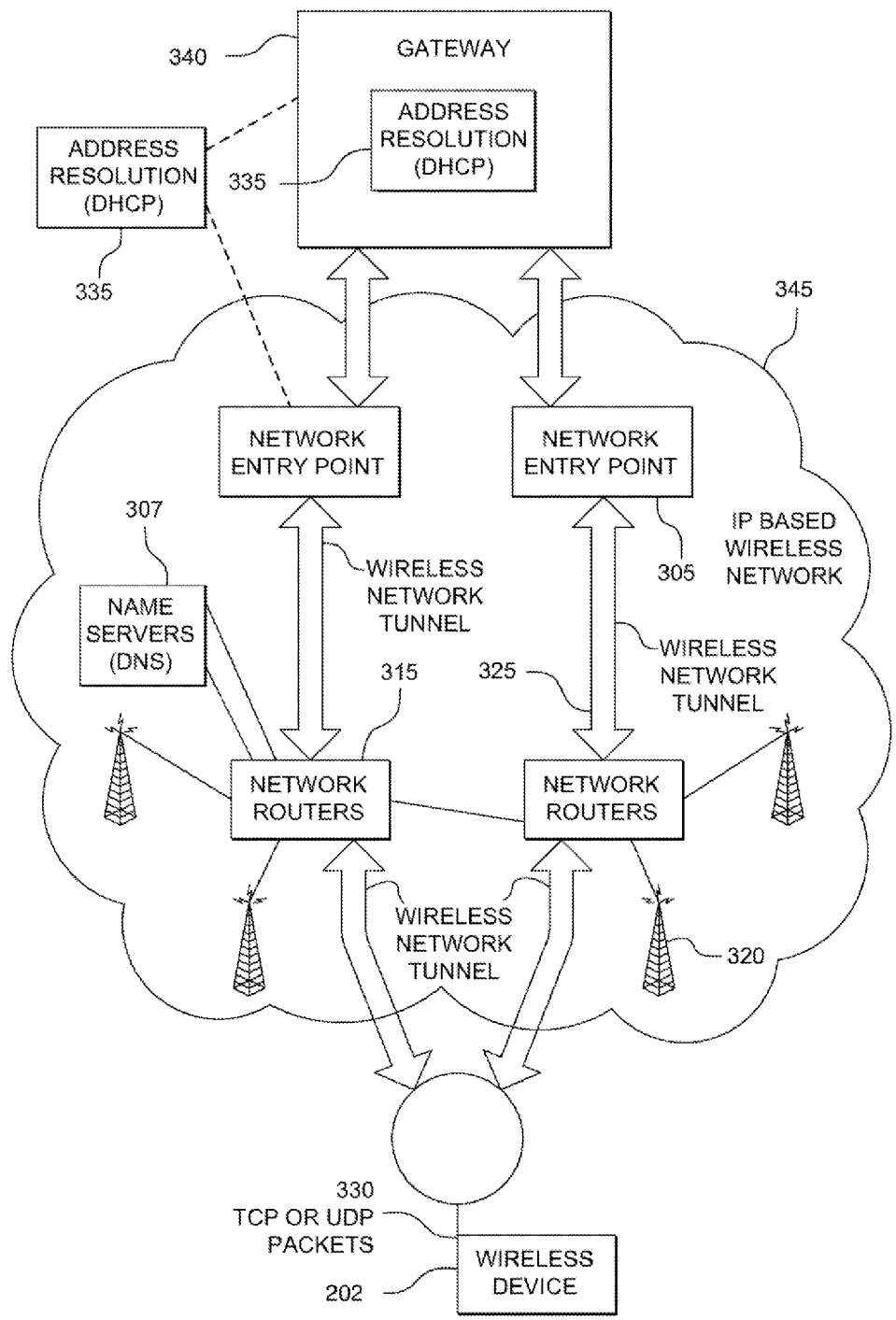
FIG. 3 is a particular structure of a system for communicating with the wireless communication device.

FIG. 3 shows a particular system structure for communicating messages to and from wireless device 202. In particular, FIG. 3 shows basic components of an IP-based wireless data packet network 345, such as a GPRS network. Wireless device 202 communicates with wireless packet data network 345, and may also be capable of communicating with a wireless voice network (not shown). The voice network may be associated with the IP-based wireless network as similar to, for example, GSM and GPRS networks, or alternatively may be a completely separate network. A GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 340 may be coupled to an internal or external address resolution component 335 and one or more network entry points 305. Data packets are transmitted from gateway 340, which is source of information to be transmitted to wireless device 202, through wireless packet data network 345 by setting up a wireless network tunnel 325 from gateway 340 to wireless device 202. In order to create this wireless tunnel 325, a unique network address is associated with wireless device 202. In an IP-based wireless packet data network, however, network addresses are typically not permanently assigned to a particular wireless device 202 but instead are dynamically allocated on an as-needed basis. Thus, wireless device 202 may acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) server as one method for providing an address resolution mechanism.

A central internal component of wireless packet data network 345 is a network router 315. Normally, network routers 315 are proprietary to the particular network, but they could alternatively be constructed from standard commercially available hardware. The purpose of network routers 315 is to centralize a plurality (e.g., thousands) of base stations 320 normally implemented in a relatively large network into a central location for a long-haul connection back to network entry point 305. In some networks there may be multiple tiers of network routers 315 and there may be cases where there are master and slave network routers 315, but in all such cases the functions of network routers 315 are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 202.

Wireless network tunnels such as a wireless tunnel 325 are opened across wireless packet data network 345 in order to allocate necessary memory, routing, and address resources to deliver IP packets. In GPRS, such tunnels 325 are established as part of what are referred to as "PDP contexts" (i.e., data sessions). To open wireless tunnel 325, wireless device 202 may use a specific technique associated with wireless packet data network 345. The step of opening such a wireless tunnel 325 may require wireless device 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 202 for redundancy, or to access different gateways and services on the network. Once the domain name is found, the tunnel is then extended to network entry point 305 and necessary resources are allocated at each of the nodes along the way. Network entry point 305 then uses address resolution component 335 (e.g., the DHCP server) component to allocate an IP address for wireless device 202. When an IP address has been allocated to wireless device 202 and communicated to gateway 340, information can then be forwarded from gateway 340 to wireless device 202.

Wireless tunnel 325 typically has a limited life, depending on wireless device's 202 coverage profile and activity. Wireless packet data network 345 will tear down wireless tunnel 325 after a certain period of inactivity or out-of-coverage period, in order to recapture resources held by this wireless tunnel 325 for other users. The main reason for this is to reclaim the IP address temporarily reserved for wireless device 202 when wireless tunnel 325 was first opened. Once the IP address is lost and wireless tunnel 325 is torn down, gateway 340 loses all ability to initiate IP data packets to wireless device 202, whether over Transmission Control Protocol (TCP) or over User Datagram Protocol (UDP).

In the present disclosure, wireless packet data network 345 may include but is not limited to (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, techniques of the present disclosure could be utilized in any suitable type of wireless network. Note that the infrastructure shown and described in relation to FIG. 3 may be representative of each one of a number of different communication networks which are provided and available in the same geographic region. One of these communication networks will be selected by the wireless device, either in an automatic or manual fashion, for communications.

Figure 4:
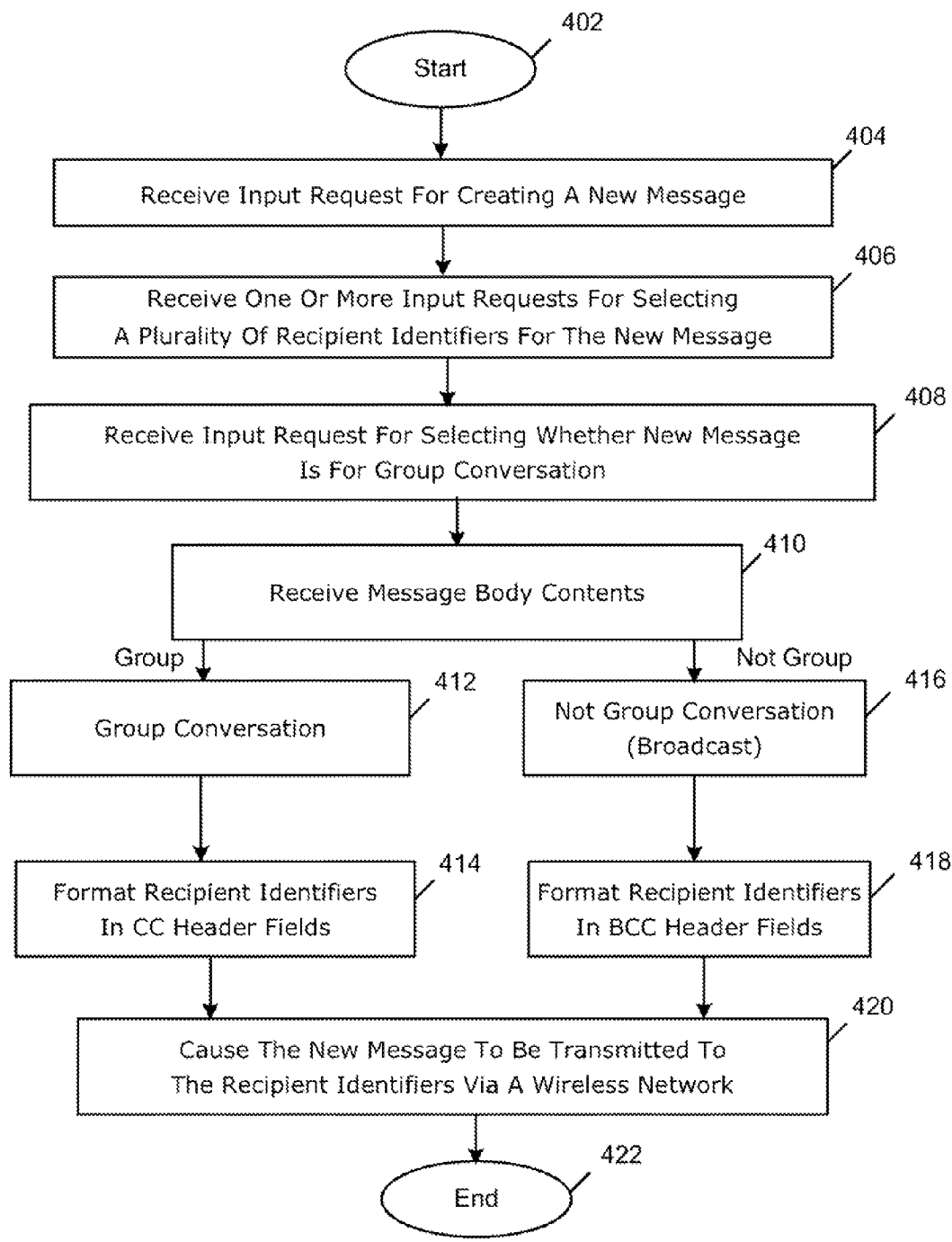
FIG. 4 is a flowchart for describing a method for use in communicating short messages to multiple recipients from the wireless communication device.

FIG. 4 is a flowchart for describing an exemplary method for use in communicating messages to multiple recipients from a communication device, such as the wireless device 102/202 described above in relation to FIGS. 1-3. In particular, the techniques described in relation to the flowchart may be performed by one or more controllers or processors of the communication device along with its wireless transceiver. A computer program product which may embody the technique may include a computer readable medium (e.g., memory of the communication device, computer disk, CD-ROM, etc.) having computer instructions stored therein which are executable by the one or more processors of the communication device for performing the technique. The flowchart of FIG. 4 will be described in combination with FIGS. 5-11, which are display presentations of display 222 of the wireless device corresponding to the steps of the flowchart.

Figure 5:
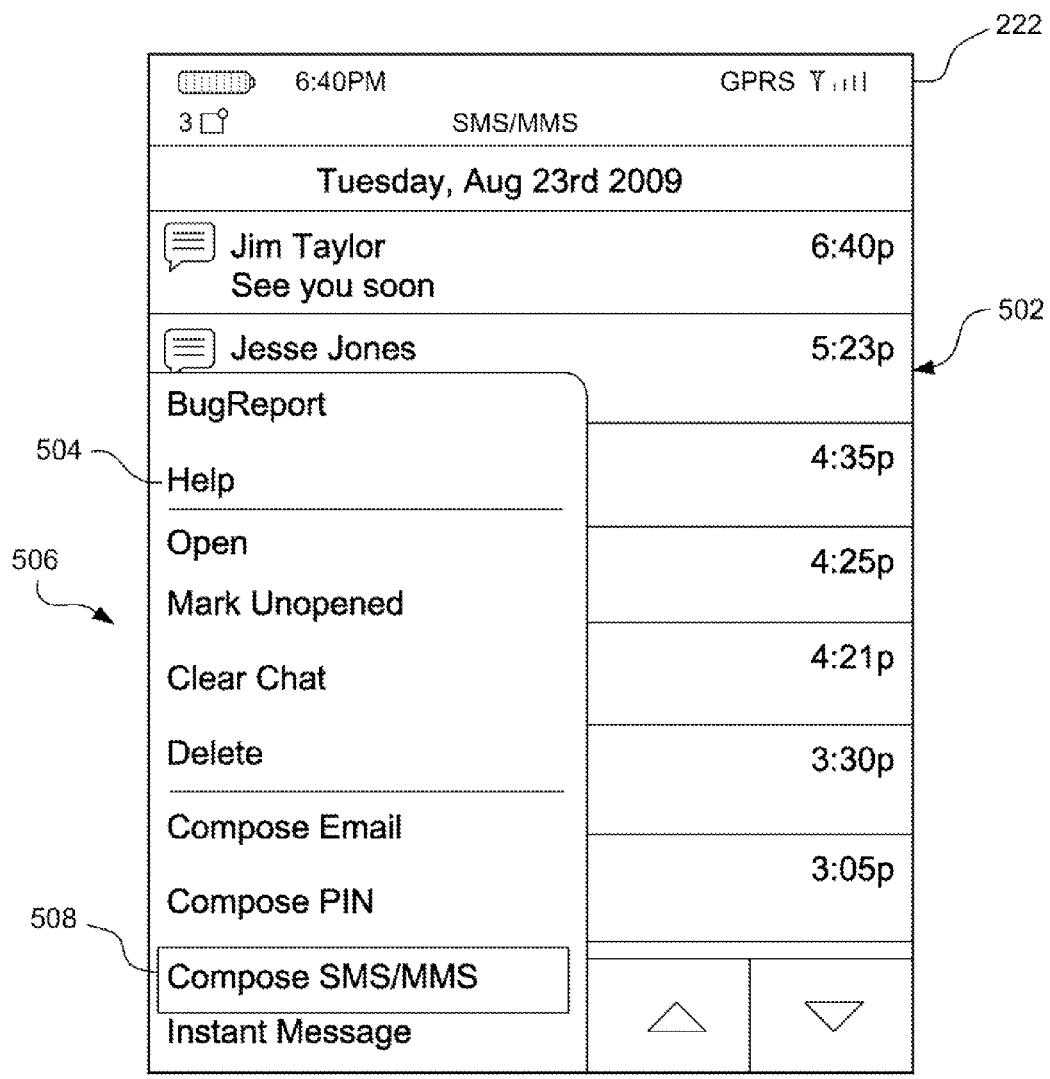
FIGS. 5-11 are display presentations in a display of the wireless communication device for depicting various actions associated with the method described in relation to FIG. 4.

Referring initially to FIG. 5, a messaging application of the wireless device is opened or activated. When the messaging application is opened, a list 502 of message headers may be shown in display 222. The message headers in list 502 correspond to previously-communicated messages which are stored in memory. The messages may include messages received at the wireless device, as well as message sent from the wireless device. The message headers of the messages may be displayed in forward or reverse chronological order from the date and time they were received or sent, for example, as shown in FIG. 5.

In the embodiment described, the messages are or include messages that may be communicated as text messages or short messages, e.g., Short Message Service (SMS) messages or Multimedia Messaging Service (MMS) messages. Such messages may be or include individual messages, group messages, or broadcast messages. The processor of the wireless device operates to process these different types of messages differently depending on the type (i.e., individual, group, or broadcast).

Individual messages are communicated only between two message participants (i.e., the user of the wireless device and another message participant). See FIG. 9 for an illustrative example of a conversation involving individual messages. For messages of the individual type, the processor of the wireless device is operative to display and make visible the sender identifier of the message sender (i.e., the other party). Note, however, that such sender identifier may be implied for each message instance (e.g., listed once in the conversation, as in FIG. 9). The processor may be further operative to enable reply messaging in response to an input request for reply. When sending such a message, the recipient identifier for the individual message may be displayed, e.g., in a recipient input field which is designated as a "TO" field. The processor may format and communicate an individual message as an SMS message or an MMS message.

On the other hand, group messages are communicated amongst a plurality of group participants (i.e., the user of the wireless device and at least two other group participants). See FIG. 11 for an illustrative example of a group conversation involving group messages. For messages of the group type, the processor is operative to process according to a group message processing mode. Here, the processor operates to display and make visible the sender identifier who sent the message, in association with the message. The processor may be further operative to enable reply messaging (i.e., reply to sender only, or reply to all) in response to an input request for reply. If a group message is being communicated, the processor operates to format and communicate the message as an MMS message. When sending such a message, although recipient identifiers for group messages may be displayed in recipient input fields which are designated as "TO" fields, the processor operates to populate "CC" fields of the MMS message with these recipient identifiers when formatting the MMS message for transmission.

Further, broadcast messages are communicated or broadcasted to a plurality of broadcast members (i.e., the user of the wireless device and at least two other members). See FIG. 10 for an illustrative example of a conversation involving broadcast messages. For messages of the broadcast (non-group) type, the processor is operative to process according to a broadcast (non-group) message processing mode. Here, the processor is operative to suppress the display of the sender identifier (who sent the message) with the message. The processor may be further operative to enable reply messaging to the sender and all recipients (or in an alternate embodiment, only to the sender identifier), in response to an input request for reply. If a broadcast message is being communicated, the processor operates to format and communicate the message as an MMS message. When sending such a message, although recipient identifiers for broadcast messages are displayed in recipient input fields which are designated as "TO" fields, the processor operates to populate "BCC" fields of the MMS message with the recipient identifiers when formatting the MMS message for transmission.

Note further that the processor of the wireless device operates to present previously-communicated messages having the same participants as part of a single conversation thread of the same "conversation" or "chat." The processor operates to associate all messages having the same participants as part of the same conversation and same conversation thread when needed.

As shown in FIG. 5, while the list 502 of message headers is displayed, the user of the wireless device uses an input mechanism of the user interface (e.g., a keyboard, touch screen display, etc.) to navigate through a menu list 504 which may be invoked in the display 222. Menu list 504 includes a plurality of function indicators 506 corresponding to a plurality of different functions which may be invoked. More specifically, many of function indicators 506 correspond to a plurality of different functions associated with messaging or messaging in connection with specific messages in menu list 504. In the example shown in FIG. 5, function indicators 506 in menu list 504 include a "Help" function indicator corresponding to a help function; an "Open" function indicator corresponding to an "open message" function; a "Mark Unopened" function indicator corresponding to a "marked message as unopened" function; an "Clear Chat" function indicator corresponding to a "clear or erase previous chat" function; a "Delete" function indicator corresponding to a "delete message" function; a "Compose E-mail" function indicator corresponding to a "create new e-mail" function; a "Compose SMS/MMS" function indicator 508 corresponding to a "create new SMS/MMS" function; and an "Instant Message" function indicator corresponding to a "create new Instant Message" function.

Figure 6:
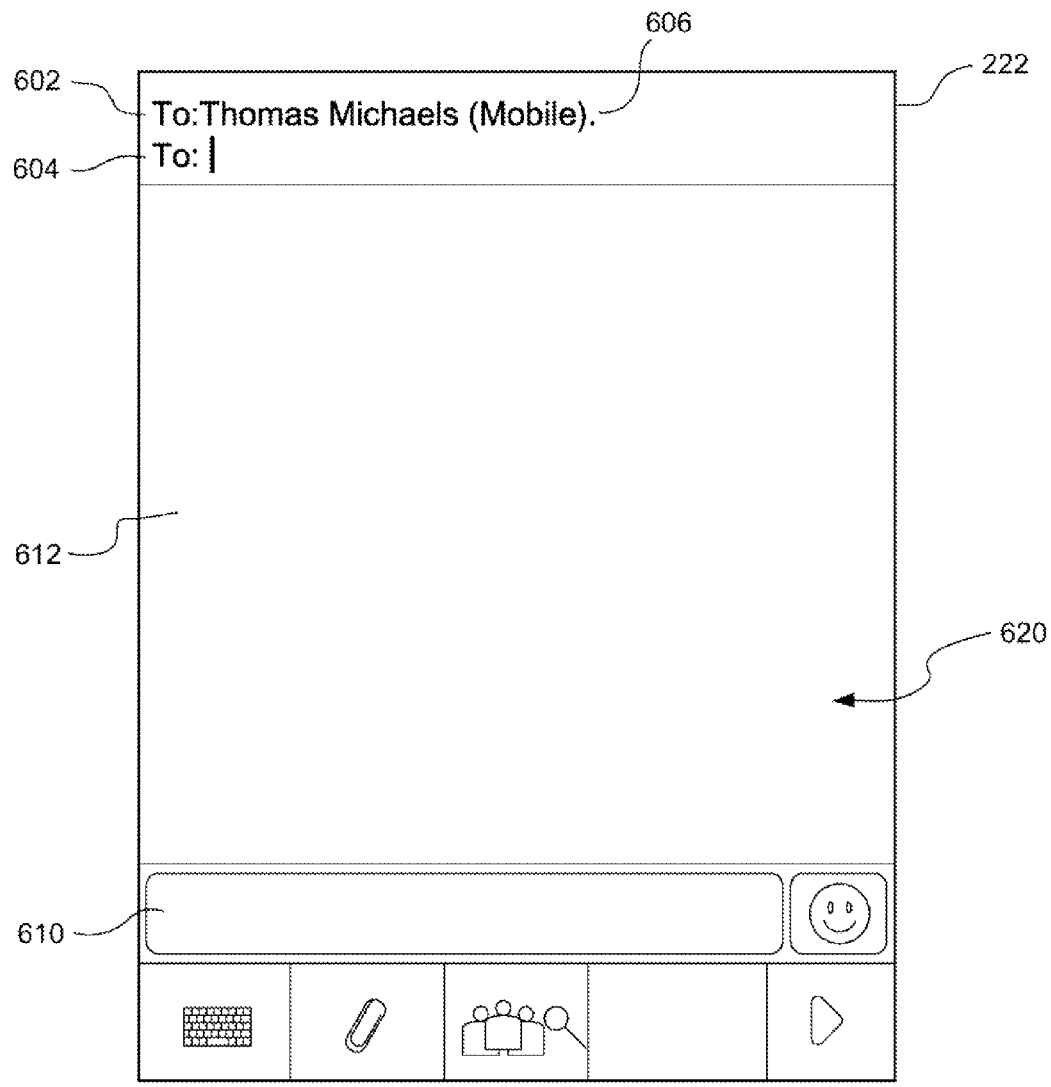

Referring back to the flowchart of FIG. 4, and beginning at a start block 402, the processor receives through the user interface an input request for creating a new message (step 404 of FIG. 4). In response, the processor causes one or more message/input fields for creating the new message to be produced in the display 222. As shown in FIG. 5, for example, with use of the input mechanism which positions a cursor, the user finds and selects "Compose SMS/MMS" indicator 508 within menu list 504. "Compose SMS/MMS" indicator 508 is for creating a new text message to be sent. An exemplary response to this selection is shown in FIG. 6, where a plurality of to message fields 612 and message input fields 602 and 610 for creating a new message 620 are presented in display 222. In this example, the message input fields for creating new message 620 include a message recipient input field 602 (e.g., a "TO" field as shown) for the user's entering or selecting of a recipient identifier, a message body input field 610 for the user's entering or selecting of text for the message, and a conversation thread field 612 for displaying any existing conversation thread.

From step 404 of FIG. 4, new message 620 of FIG. 6 is initially "blank" and requires input from the user, and the cursor is generally set within the message recipient input field 602. Then, the processor receives through the user interface (e.g., through keyboard and/or touch screen display, for example) an input request for selecting a recipient identifier 606 (step 406 of FIG. 4). The recipient identifier 606 may be a recipient name, telephone number (e.g., a Mobile Station International ISDN (MSISDN) or the like), or an address (e.g., an e-mail address), as examples.

Figure 7:
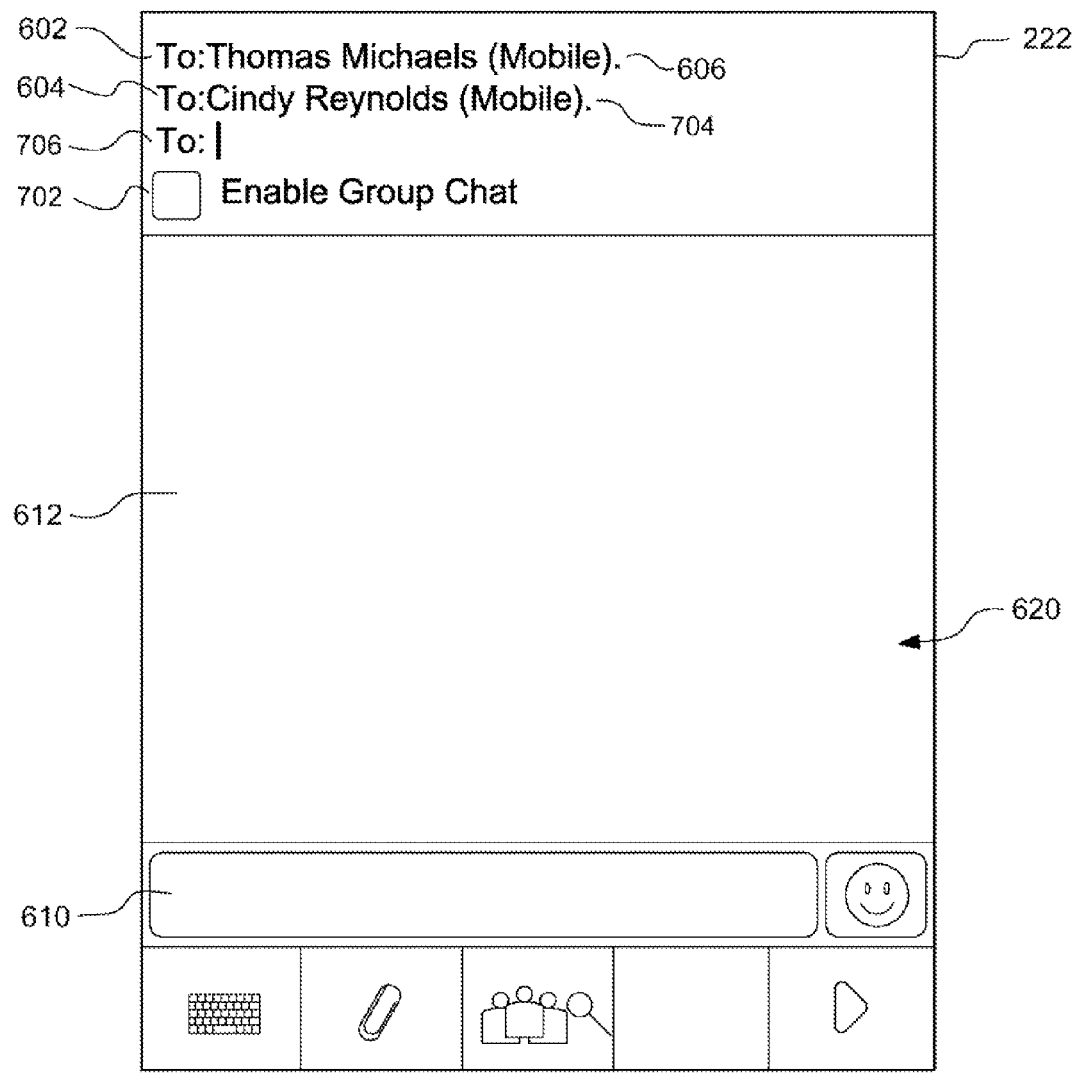
Figure 8:
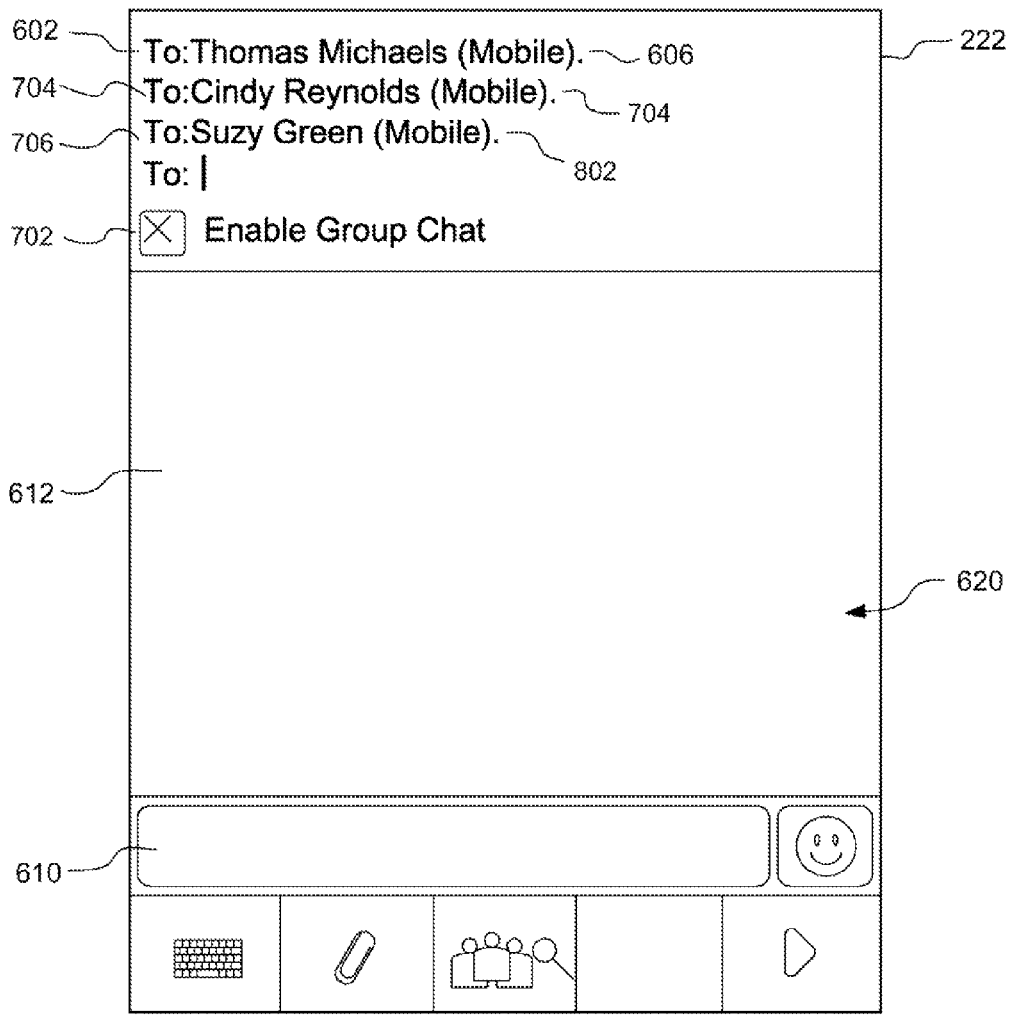
Figure 9:
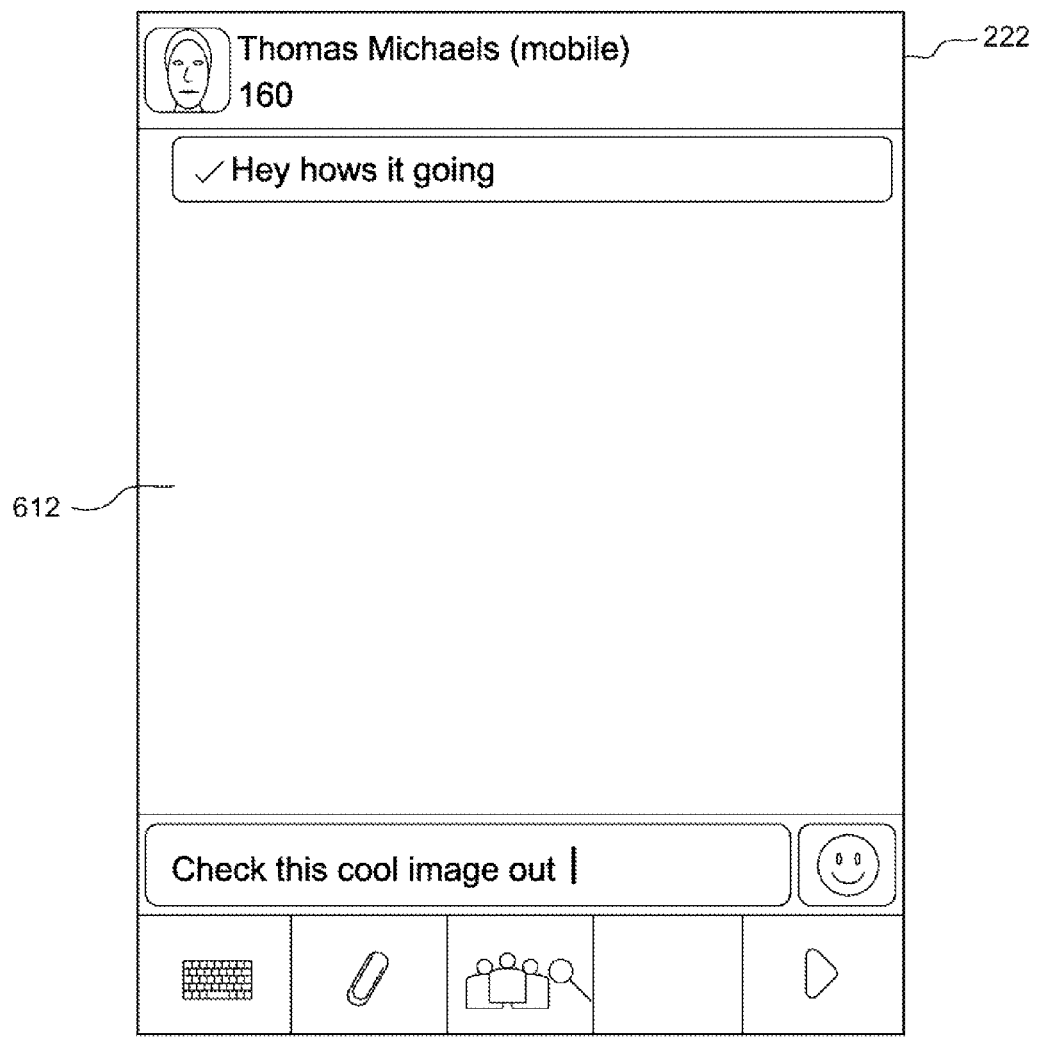
Figure 10:
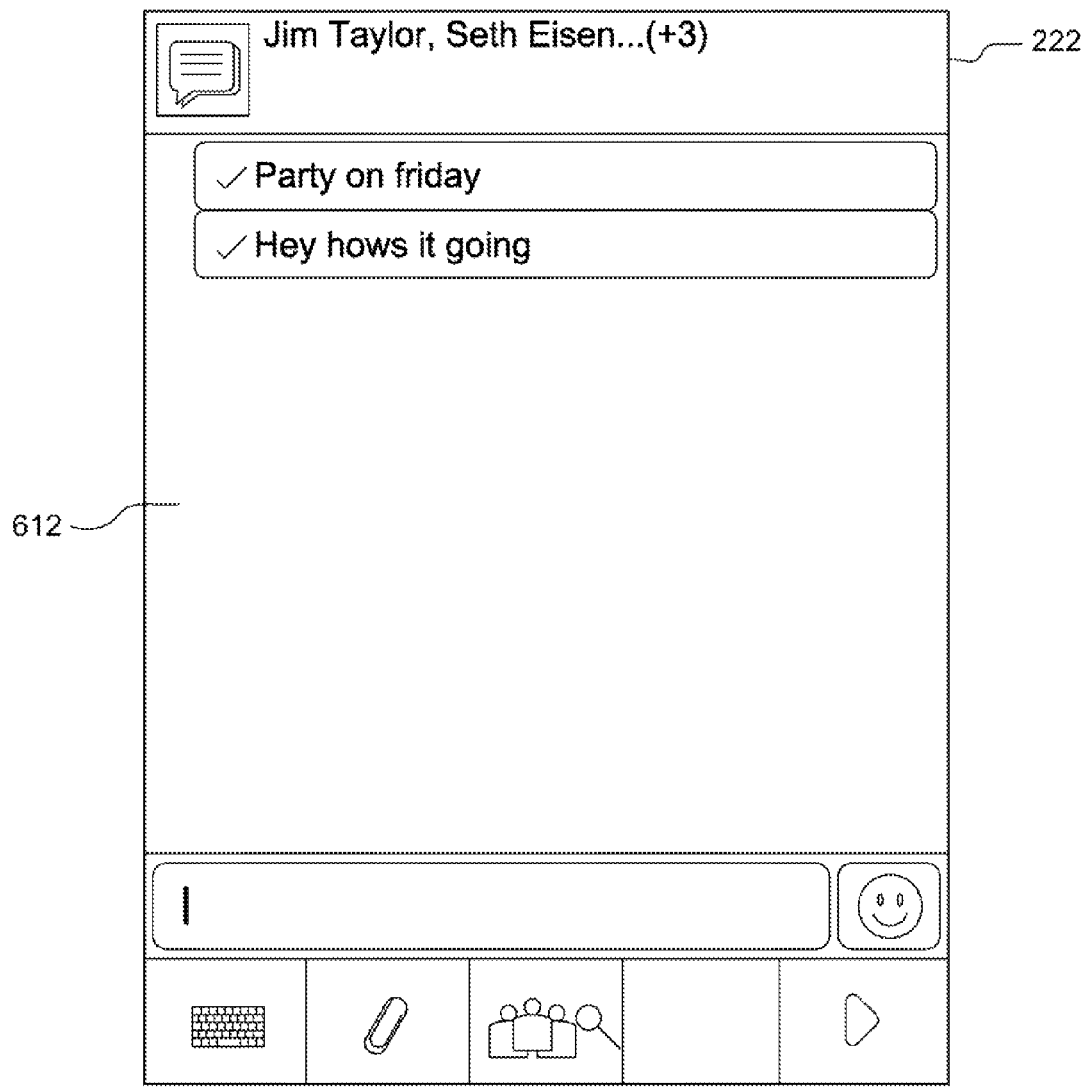
Figure 11:
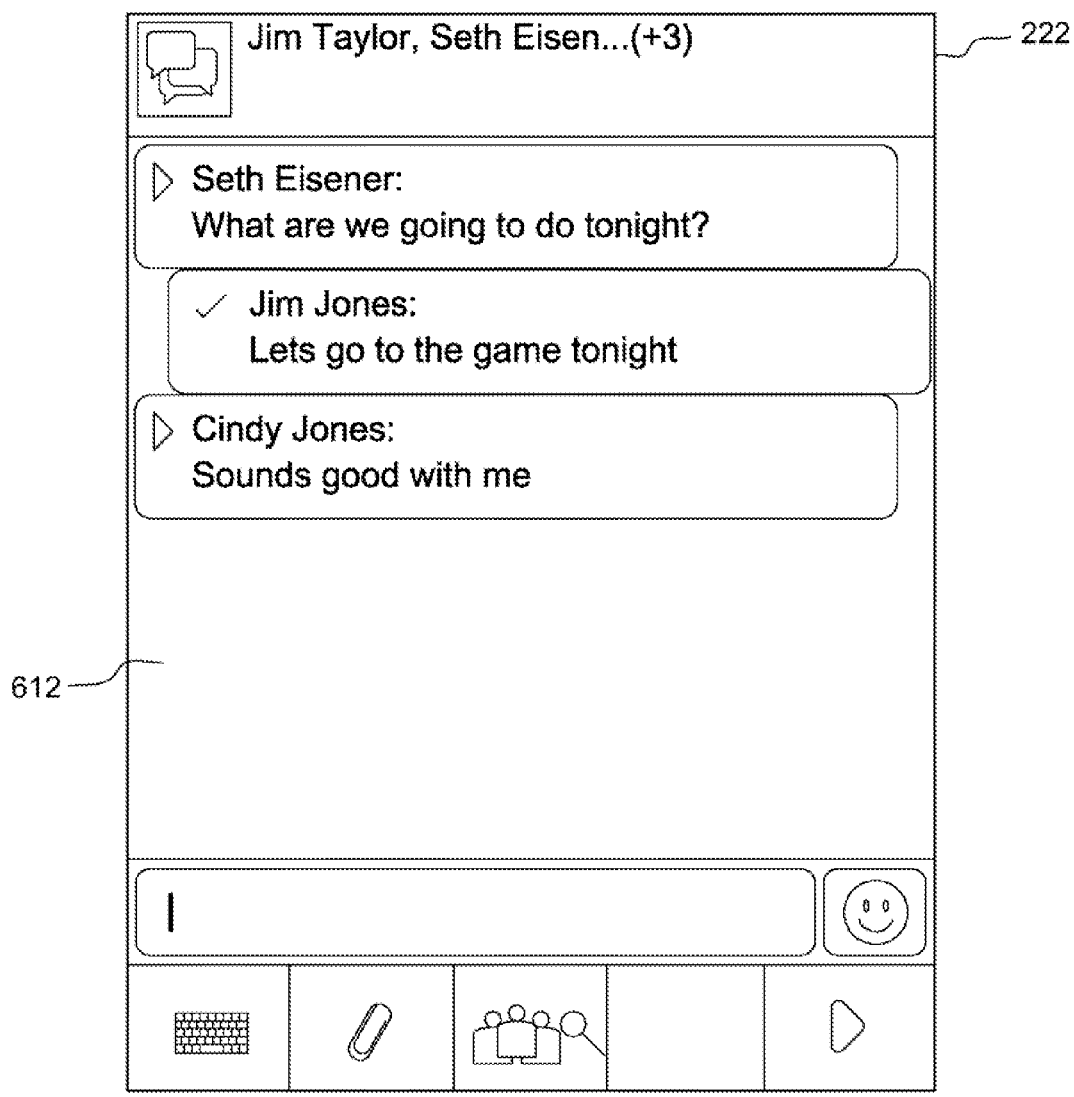

Upon such selection and display, an additional message recipient input field 604 (e.g., another "TO" field) is presented in display 222, and the cursor may be automatically set or positioned within this field 604 as shown. Thus, as depicted in FIG. 7, the user may select an additional recipient identifier 704 which is displayed in additional message recipient input field 604. Upon such selection and display, a further message recipient input field 706 (e.g., another "TO" field) is presented in display 222, and the cursor may be automatically set or positioned within this field 706 as shown. Thus, as further depicted in FIG. 8, the user may select a further recipient identifier 802 which is displayed in further message recipient input field 706. Note that this may continue for even further additional recipient identifiers.

In response to the selection of more than one recipient identifier in step 406 of FIG. 4, the processor operates to present a user input field and receive an input request for selecting whether or not the new message is for a group conversation (step 408 of FIG. 4). For example, in FIGS. 7-8, a user input checkbox 702 which indicates "Enable Group Chat" is presented. In this example, if the user input checkbox 702 is checked, then the user has indicated that the new message is for a group conversation. Otherwise, if the user input checkbox 702 is unchecked, then the user has indicated that the new message is not for a group conversation (rather, e.g., it is for a broadcast message). In the illustrated example in FIGS. 7-8, the user input checkbox 702 is shown as unchecked in FIG. 7 (i.e., not for group conversation, but rather for broadcasting) and shown as checked in FIG. 8 (i.e., for group conversation).

Message body input field 610 of new message 620 is also "blank" and requires input from the user; the cursor is generally set at the beginning of the message body input field 610. Responsive to the user's actions, the processor receives via the user interface (e.g., through keyboard and/or touch screen display, for example) message body contents (e.g., text, such as alphanumeric characters entered or selected by the user) being entered into message body input field 610 (step 410 of FIG. 4). Note that this information makes up the main body of the new message to be sent. Subsequently, the processor receives through the user interface an indication to send the new message (e.g., "SEND" or "SEND MESSAGE" invoked by the user).

In response to the indication to send the new message, when the new message is identified to be for initiating a group conversation (step 412 of FIG. 4), then each recipient identifier is taken from the TO field and formatted in a CC header field of the new message (step 414 of FIG. 4). For example, the recipient identifiers may be formatted in CC header fields which are CC header fields of an MMS message.

On the other hand, when the new message is identified to not be for initiating a group conversation (e.g., a broadcast message) (step 416 of FIG. 4), then each recipient identifier is taken from its TO field and formatted in a BCC header field of the new message (step 418 of FIG. 4). For example, the recipient identifiers may be formatted in BCC header fields which are BCC header fields of an MMS message.

The processor then causes the formatted new message to be transmitted to the recipient identifiers via the wireless communication network (step 420 of FIG. 4). The flowchart ends at an end block 422 of FIG. 4.

After a message is transmitted via the wireless network, the message is received by the recipient devices. As described in relation to the flowchart of FIG. 4, although upon creation of a group message the recipient identifiers are displayed in recipient input fields which are designated as "TO" fields, the processor operates to populate "CC" fields of the MMS message with these recipient identifiers when formatting the MMS message for transmission. The "TO" fields of the MMS message are left blank or empty. The processor of the recipient device operates to identify and process an incoming MMS message as a group message based on identifying the multiple recipients in the CC fields. The processor is operative to process group messages according to the group message processing mode. Here, the processor operates to display and make visible the sender identifier who sent the message, in association with the message. The processor may be further operative to enable reply messaging (i.e., reply to sender only, or reply to all) in response to an input request for reply. See again FIG. 11 for an illustrative example of the way in which the processor of recipient devices processes group messages of a group conversation.

Further, although upon creation of a broadcast message the recipient identifiers are displayed in recipient input fields which are designated as "TO" fields, the processor operates to populate "BCC" fields of the MMS message with these recipient identifiers when formatting the MMS message for transmission. The "TO" fields of the MMS message are left blank or empty. The processor of the recipient device operates to identify and process an incoming MMS message as a broadcast message based on identifying the multiple recipients in the BCC fields. The processor is operative to process the broadcast message according to the broadcast (non-group) message processing mode. Here, the processor is operative to suppress the display of the sender identifier (i.e., who sent the message) with the message. The processor may be further operative to enable reply messaging to the sender and all recipients (or alternatively only to the sender identifier), in response to an input request for reply. See again FIG. 10 for an illustrative example of the way in which the processor of recipient devices processes broadcast messages of a broadcast.

As apparent, the techniques of the present disclosure provide for a reduced number and simplified input fields for multiple recipients, such that the user interface is simplified for messaging for the end user.

Methods and apparatus for use in communicating messages to multiple recipients from a wireless communication device have been described. The wireless device receives, at a user interface, an input selection for creating a new message, as well as one or more input selections for selecting a plurality of recipient identifiers in "TO" fields of the new message. The wireless device also receives, via the user interface, an input selection for indicating whether or not the new message is for a group conversation. When the input selection indicates that the new message is for a group conversation, the wireless device formats each recipient identifier in a first header field (e.g., a CC header field) of the message. When the input selection indicates that the new message is not for a group conversation, the wireless device formats each recipient identifier in a second header field (e.g., a BCC header field) of the message. The message which includes message body contents is then transmitted to the recipient identifiers via a wireless communication network. Recipient devices may process the message as group or non-group (e.g., broadcast) depending on the field locations of the recipient identifiers.

The above-described embodiments of disclosure are intended to be examples only. For example, the techniques may apply to other types of messages such as instant messages or email messages. Also for example, the recipient identifiers may be populated in the header fields in the opposite fashion (BCC header fields for group and CC header fields for non-group), or different header fields may be utilized depending on what types of messaging is utilized. Alterations, modifications, and variations may be effected to particular embodiments by those of skill in art without departing from scope of invention, which is defined solely by claims appended hereto.

What is claimed is:

1. A method in a wireless communication device for use in communicating messages via a wireless communication network, the method comprising:

receiving, via a user interface of the wireless communication device, a first input request for creating a new message;

receiving, via the user interface, in one or more TO fields of the new message, one or more second input requests for selecting a plurality of recipient identifiers for the new message;

receiving, via the user interface, a third input request which indicates whether the new message is for a group conversation;

when the third input request indicates that the new message is for a group conversation, formatting the recipient identifiers in CC header fields of the new message;

otherwise, when the third input request indicates that the new message is not for a group conversation, formatting the recipient identifiers in BCC header fields of the new message; and causing the new message to be transmitted from the wireless communication device via the wireless communication network to the recipient identifiers.

2. The method of claim 1, further comprising:

receiving, via the user interface, an indication to send the new message;

in response to the indication to send the new message when the third input request indicates that the new message is for the group conversation, formatting each recipient identifier from the TO field in the CC header fields; and in response to the indication to send the new message when the third input request indicates that the new message is not for a group conversation, formatting each recipient identifier from the TO field in the BCC header fields.

3. The method of claim 1, wherein the new message comprises a Multimedia Messaging Service (MMS) message.

4. The method of claim 1, further comprising:
presenting a user input checkbox;
when the user input checkbox is checked, then the new message being for the group conversation; and
otherwise, when the user input checkbox is unchecked, then the new message not being for the group conversation.

5. The method of claim 1 wherein, when the new message is not for a group conversation, the new message is processed as a broadcast message which includes suppressing a display of a sender identifier of the new message with the new message.

6. The method of claim 1, wherein a processor of the wireless communication device is configured to format the recipient identifiers in the CC header fields or BCC header fields without user intervention.

7. The method of claim 1, wherein the recipient identifiers comprise at least some of recipient names, recipient telephone numbers, or recipient addresses.

8. The method of claim 1, further comprising:
receiving, at a recipient device, the new message;
displaying the new message in a display of the recipient devices; and
when the recipient identifiers are formatted in the CC header fields of the new message, processing the new message as part of a group conversation which includes displaying in the display a sender identifier of the new message with the new message.

9. The method of claim 1, further comprising:
receiving, at a recipient device, the new message;
displaying the new message in a display of the recipient device; and
when the recipient identifiers are formatted in the BCC header fields of the new message, processing the new message as a broadcast message which includes suppressing a display of a sender identifier of the new message while the new message is being displayed.

10. The method of claim 1, further comprising:
receiving, at a recipient device, the new message;
displaying the new message in a display of the recipient device; and
when the recipient identifiers are formatted in the CC header fields of the new message, processing the new message as part of a group conversation, which includes displaying in the display a sender identifier of the new message with the new message; and
when the recipient identifiers are formatted in the second header fields of the new message, processing the new message as a broadcast message, which includes suppressing a display of a sender identifier of the new message while the new message is being displayed.

11. The method of claim 10, further comprising:
wherein processing the new message as part of the group conversation comprises making the recipient identifiers visible in a display while the new message is being displayed; and
wherein the processing the new message as the broadcast message comprises suppressing the display of the recipient identifiers from the display while the new message is being displayed.

12. A computer program product, comprising:
a non-transitory computer readable medium;
computer instructions stored in the computer readable medium; and
the computer instructions being executable by one or more processors of a wireless communication device for:
receiving, via a user interface of the wireless communication device, a first input request for creating a new message;
receiving, via the user interface, in one or more TO fields of the new message, one or more second input requests for selecting a plurality of recipient identifiers for the new message;
receiving a third input request which indicates whether the new message is for a group conversation;
when the third input request indicates that the new message is for a group conversation, formatting the recipient identifiers in CC header fields of the new message;
otherwise, when the third input request indicates that the new message is not for a group conversation, formatting the recipient identifiers in BCC header fields of the new message; and
causing the new message to be transmitted via a wireless communication network to the recipient identifiers.

13. A wireless communication device, comprising:
one or more processors;
a wireless transceiver coupled to the one or more processors, the wireless transceiver configured for communications in a wireless communication network;
a user interface coupled to the one or more processors, the user interface comprising a display;
memory coupled to the one or more processors;
the one or more processors being configured to:
receive, via the user interface, a first input request for creating a new message;
receive, via the user interface, in one or more TO fields of the new message, one or more second input requests for selecting a plurality of recipient identifiers for the new message;
receive, via the user interface, a third input request which indicates whether the new message is for a group conversation;
when the third input request indicates that the new message is for a group conversation, format the recipient identifiers in first header fields of the new message;
otherwise, when the third input request indicates that the new message is not for a group conversation, format the recipient identifiers in second header fields of the new message; and
cause the new message to be transmitted, via the wireless transceiver, to the recipient identifiers via a wireless communication network.

14. The wireless communication device of claim 13, wherein the one or more processors are further configured to:
receive, via the user interface, an indication to send the new message;
in response to the indication to send the new message when the third in input request indicates that the new message is for the group conversation, format each recipient identifier from the TO field in the CC header fields; and
in response to the indication to send the new message when the third input request indicates that the new message is not for a group conversation, format each recipient identifier from the TO field in the BCC header fields.

15. The wireless communication device of claim 13, wherein the message comprises a Multimedia Messaging Service (MMS) message.

16. The wireless communication device of claim 13, wherein the one or more processors are further configured to:
  present a user input checkbox;
    when the user input checkbox is checked, the new message being for the group conversation; and
    when the user input checkbox is unchecked, the new message not being for the group conversation.

17. The wireless communication device of claim 13, wherein the one or more processors are further configured to:
  when the new message is not for the group conversation, process the new message as a broadcast message which includes suppressing a display of a sender identifier of the new message with the new message.

18. The wireless communication device of claim 13, wherein the one or more processors are configured to format the recipient identifiers in the CC header fields or BCC header fields without user intervention.

19. The wireless communication device of claim 13, wherein the recipient identifiers comprise at least some of recipient names, recipient telephone numbers, and recipient addresses.

20. A communication system, comprising:
  a wireless communication network;
  a first wireless communication device operative in the wireless communication network;
  the first wireless communication device being configured to:
    receive, via a user interface, a first input request for creating a new message;
    receive, via the user interface, in one or more TO fields of the new message, one or more second input requests for selecting a plurality of recipient identifiers for the new message, the recipient identifiers identifying at least a second wireless communication device and a third wireless communication device operative in the wireless network;
    receive, via the user interface, a third input request which indicates whether the new message is for a group conversation;
    when the third input request indicates that the new message is for a group conversation, format the recipient identifiers corresponding to the second wireless communication device and the third wireless communication device in CC header fields of the new message;
    otherwise, when the third input request indicates that the new message is not for a group conversation, format the recipient identifiers corresponding to the second wireless communication device and the third wireless communication device in BCC header fields of the new message; and
    cause the new message to be transmitted, via the wireless communication network, to second wireless communication device and the third wireless communication device identified by the recipient identifiers.

21. The communication system of claim 20, wherein the first wireless communication device is further configured to:
  receive, via the user interface, an indication to send the new message;
  in response to the indication to send the new message when the third input request indicates that the new message is for the group conversation, format each recipient identifier from the TO field in the CC header fields; and
  in response to the indication to send the new message when the third in input request indicates that the new message is not for a group conversation, format each recipient identifier from the TO field in the BCC header fields.

22. The communication system of claim 20, wherein the message comprises a Multimedia Messaging Service (MMS) message.

23. The communication system of claim 20, wherein the first wireless communication device is further configured to:
  present a user input checkbox;
    when the user input checkbox is checked, the new message being for the group conversation; and
    otherwise, when the user input checkbox is unchecked, the new message not being for the group conversation.

24. The communication system of claim 20, wherein the first wireless communication device is further configured to, when the new message is not for the group conversation, the new message is processed as a broadcast message which includes suppressing a display of a sender identifier of the new message with the new message.

* * * * *